United States Patent

[11] 3,583,723

| [72] | Inventors | Charles P. Nowell<br>7302 Melvase, Buena Park, Calif. 90620;<br>Aubry S. Nowell, 832 Felicidad, Anaheim, Calif. 92804 |
|---|---|---|
| [21] | Appl. No. | 860,709 |
| [22] | Filed | Sept. 24, 1969 |
| [45] | Patented | June 8, 1971 |

[54] DOLLY
8 Claims, 4 Drawing Figs.

[52] U.S. Cl. .................................................... 280/79.1, 214/333
[51] Int. Cl. .................................................... B62b 5/00
[50] Field of Search .......................................... 280/79.1, 79.2, 35; 214/330, 331, 333, 505

[56] References Cited
UNITED STATES PATENTS

| 2,349,251 | 5/1944 | Domoj .......................... | 280/35 |
| 2,380,415 | 7/1945 | Carruthers .................... | 280/35 |
| 2,569,050 | 9/1951 | Gref et al. .................... | 214/505 |

Primary Examiner—Kenneth H. Betts
Assistant Examiner—Robert R. Song
Attorney—Allen A. Dicke, Jr.

ABSTRACT: The dolly has a longitudinal main frame member which defines the front-to-back axis of the dolly. Axles are secured at right angles to the main frame member and carry rotatable wheels on the ends thereof. Each of the axles also rotatably carries a tire support pad which is latchable in a raised position. With the pads in a lowered position, the dolly is slid in a transverse direction under a wheel of the vehicle to be supported thereby. The tire support pads are then raised and locked to support that tire of the vehicle.

PATENTED JUN 8 1971 3,583,723
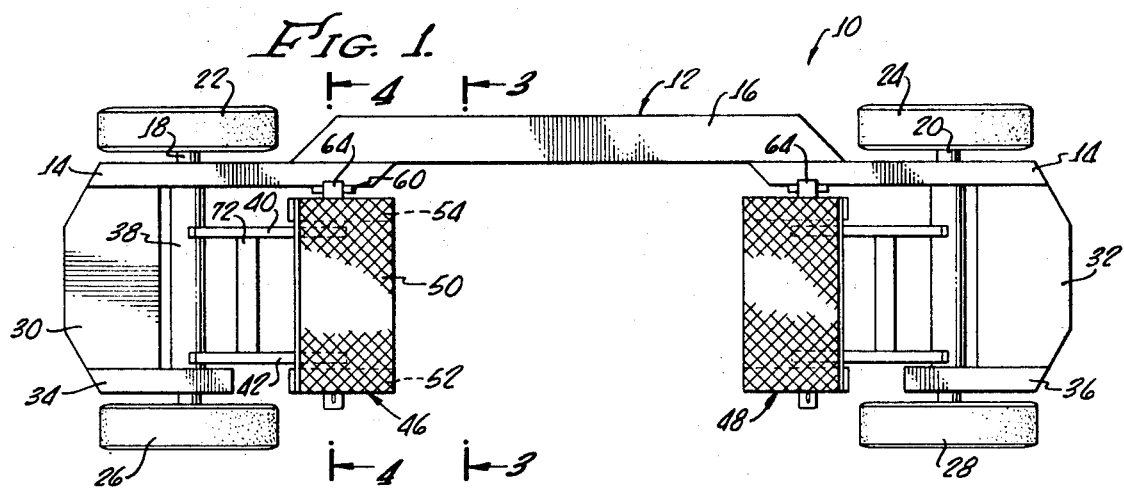
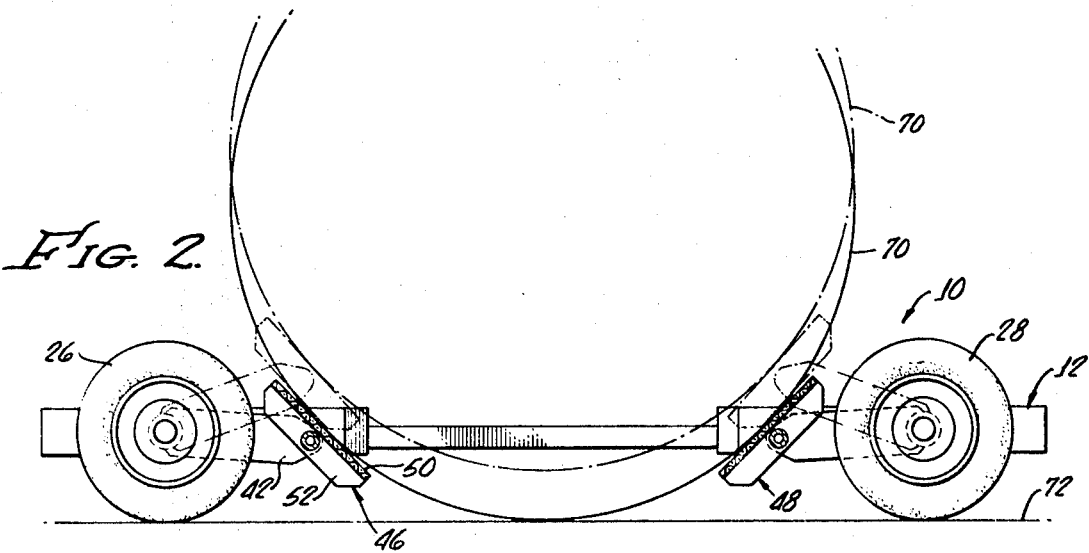
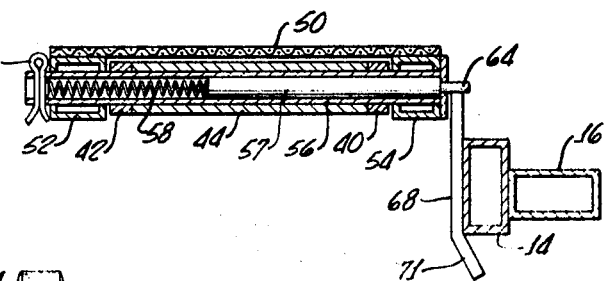
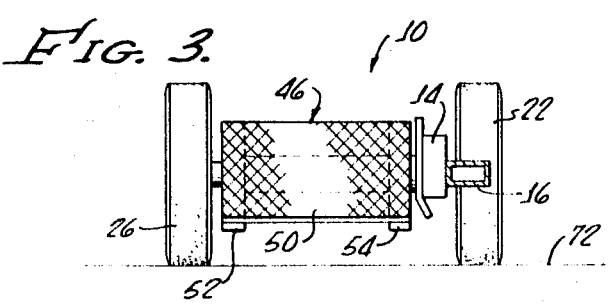
INVENTORS.
CHARLES P. NOWELL
AUBRY S. NOWELL
BY
Allen A. Dicke, Jr.,
AGENT.

DOLLY

BACKGROUND

This invention is directed to a dolly, and particularly a dolly for supporting a wheel of a vehicle, which is to be moved without employment of that wheel. The dolly is, thus, a single wheel-supporting dolly. The dolly has its own wheels, which are aligned in the direction of the vehicle wheels so that the vehicle can be moved while partially supported upon the dolly.

The principal dollies presently in use comprise four-wheel structures having two tire-supporting pads thereon, so that an entire end of the vehicle to be supported can be carried on the dolly. These prior art dollies may be either rigid structures, or may be structures which can be simply assembled under the damaged vehicle to cause the raising of the damaged vehicle. An eminent structure of the latter class is found in Charles P. Nowell U.S. Pat. No. 3,198,538. Both of these prior classes of structures are capable of supporting the entire end of the vehicle and are very helpful in those cases where an accident has occurred and the vehicle is highly disabled. Thus, since these prior art dollies were designed to extend the full width of the vehicle and support an entire end of the vehicle, one end of the vehicle could be supported by one of these dollies, while the other end is lifted by a tow truck for towing away. It is clear that such dollies are very good for their purpose, but in view of their larger size, their application is more difficult and, thus, is somewhat limited. Furthermore, the full-size, rigid dolly must be employed in conjunction with a tow truck, for a tow truck is necessary to lift the disabled end of the vehicle so that the dolly may be placed thereunder. This detriment is absent from the prior Charles P. Nowell patent, but still the dolly is a full-size unit for supporting one entire end of the disabled vehicle and, thus, is more than is needed for some applications.

SUMMARY

In order to aid in the understanding of the invention, it can be stated in essentially summary form that it is directed to a dolly. The dolly has a main frame member, which defines the front and back dimension of the dolly. The main frame carries first and second transverse shafts, and wheels are mounted on the shafts rotatable with respect to the frame so that the dolly can move generally in the direction of its main frame member. First and second vehicle-supporting means are movably mounted upon the frame. In use, the vehicle-supporting means are placed in a lowered position, and the dolly is slid under a portion of the vehicle to be carried, with the first and second wheel-supporting shafts preferably to the front and rear of a wheel on the vehicle. Thereupon, the vehicle-supporting means are moved to raised position and locked in the raised position so that that portion of the vehicle is supported on the dolly and can be moved on the dolly wheels.

Accordingly, it is an object of this invention to provide a dolly which is positionable to support only one wheel of a vehicle. It is a further object to provide a dolly which can be slid sideways partially beneath a vehicle, so that wheel-engaging members on the dolly can be raised to lift a portion of the vehicle, so that the vehicle may be supported, in part, by the dolly as the vehicle is moved. It is a further object to provide a dolly having a longitudinal main frame member, with transverse shafts mounted upon the frame member to define a U-shaped dolly. It is still another object to mount rotatable wheels upon the transverse shafts so that the dolly is movable generally in the direction of the main frame member. It is a further object to provide a dolly having substantially all of its parts made of tubular material so that the dolly is of a high strength-to-weight ratio. It is still another object to provide a dolly which has first and second vehicle-engaging pads movably mounted thereon, and movable from a position away from vehicle engagement to a position of vehicle engagement where the vehicle is supported on the dolly, and means to lock the vehicle-supporting pads in the raised position. It is still another object to size the dolly so that the dolly can be engaged with respect to a vehicle wheel, to raise the vehicle out of engagement with the pavement so that the dolly supports the raised wheel, out of engagement with the pavement. It is still another object of this invention to provide a dolly which can be quickly installed at a vehicle wheel, and quickly operated so that the vehicle wheel is raised so that the vehicle can be quickly supported upon a dolly and moved away. It is a further object to provide a dolly which can support one of the rear wheels of an automobile, so that the vehicle can drive away under its own power; for example, when the supported wheel is flat. It is still another object to provide a dolly which can be placed under one of the front wheels of an automotive vehicle so that the vehicle can be driven away under its own power; for example, when that front wheel is flat, and in some cases, employ two such dollies under both front wheels at the same time. Other objects and advantages of this invention will become apparent from a study of the following portion of the specification, the claims and the attached drawings.

BRIEF DESCRIPTION OF THE DRAWINGS

FIG. 1 is a top-plan view of the dolly of this invention.

FIG. 2 is a side-elevational view of the dolly, showing the vehicle-supporting means in lowered position in full lines, and in raised position in dot-dash lines.

FIG. 3 is a section taken generally along the lines 3-3 of FIG. 1.

FIG. 4 is an enlarged section taken generally along the lines 4-4 of FIG. 1.

DESCRIPTION

The dolly is generally indicated at 10 in the drawings. Dolly 10 has a frame 12 which includes longitudinal main frame member 14. Main frame member 14 comprises short end pieces and side piece 16. Together, they form a main frame member of adequate strength. Main frame member 14 is preferably of tubular structure, as is seen in FIG. 4, in order to provide a maximum strength consistent with a light weight. Any suitable securing means can secure the various parts of dolly 10 together, but welding is preferable because of its rigidity and its joining strength, with minimum weight. Dolly 10 is preferably symmetrical about its transverse centerline, and can run either way. Accordingly, either end can act as the front of the dolly. However, the main frame member is aligned with the lengthwise direction of the dolly and defines the direction in which the dolly moves.

First and second shafts 18 and 20 are arranged transversely of main frame member 14. The shafts are preferably rigidly secured to the main frame member. First and second wheels 22 and 24 are rotatably mounted upon the outboard ends of shafts 18 and 20, respectively, and are arranged so that they cannot move off the end of the shafts. Side piece 16 is terminated at its ends to provide sufficient space for wheels 22 and 24.

The outboard ends of shafts 18 and 20, respectively, carry third and fourth wheels 26 and 28. Again, wheels 26 and 28 are rotatably mounted upon their shafts, and are arranged so that they cannot come off the end of the shafts. In order to provide proper support for the shafts, in addition to their passing through main frame member 14, cross members 30 and 32 extend laterally away from the main frame member 14 parallel to shafts 18 and 20. The ends of cross members 30 and 32, respectively, carry brackets 34 and 36, which engage the shafts 18 and 20 adjacent wheels 26 and 28. The cross members and brackets are, again, preferably of tubular stock to provide maximum rigidity with minimum strength. Thus, a fairly rigid structure, having an open side, including the maintenance of parallelism of shafts 18 and 20, is provided. The shafts 18 and 20 can either be journaled in main frame member 18 and brackets 34 and 36, or may be rigidly mounted with respect thereto with their wheels rotatably mounted thereon. Either structure is operable.

Tube 38 is rotatably mounted upon shaft 18 between main frame 14 and bracket 34. It carries arms 40 and 42 secured thereto. Tubular spacer 44 is secured between the arms so their outer ends are at a fixed distance with respect to each other.

Vehicle-supporting means 46 and 48 are identical and support means 46 will be described. It comprises treadplate 50, which is mounted upon first and second end bars 52 and 54. The end bars are preferably, again, tubular for best strength-to-weight ratio. They are shown as being square tubes in FIG. 4, where it is shown that the end bars embrace arms 40 and 42. Tubular pivot 56 extends through spacer 44, through appropriate holes in arms 40 and 42, and through holes in end bars 52 and 54, so that the vehicle support pads can rotate upon the axis of pivot 56. Pivot 56 is preferably secured, as by welding, to end bars 52 and 54. Latch pin 57 is slidably mounted within pivot tube 56 and is urged to the right by spring 58. Cotter pin 60 holds the spring in pivot tube 56. Removal of cotter pin 60 permits removal of spring 58 and latch pin 57.

Latch pin 57 is limited in its rightward motion by cover plate 62, which has a reduced size opening therein. Thus, only nose 64, which is integral with and of reduced size with respect to the body of pin 57, can extend to the right of cover plate 62. Cover plate 62 is welded in place.

Latch plate 68 is secured on main frame member 14, as is shown in FIG. 4. The upper end of latch plate 68 has a latch face thereon, on which can be engaged the nose end 64 of latch pin 57. When so engaged, as is shown in FIG. 4, the vehicle support means 46 is in the raised, dot-dash line position shown in FIG. 2. When in such position, together with its companion vehicle support means or pads 48, a tire 70 of a vehicle is held above the surface 72 of the pavement.

When disengaged, the vehicle support means occupies the solid line, lower position in FIG. 2, in which case the latch pin 57 is below the latch face. The lower end of latch plate 68 carries bevel 71, which thrusts latch pin 57 backward against spring 58 as the vehicle support means is raised. When the vehicle support means reaches the proper height, the latch pin extends onto the top of latch plate 68.

Raising the vehicle support means 46 is managed by placing a prybar over tube 38 and under crossbar 72 and thrusting down on the outer end of the prybar. This raises one of the support means until nose 64 of the latch pin snaps into place. This step is repeated for the other vehicle support means.

In use, the dolly 10 is brought up to an automotive vehicle to be moved. The vehicle to be moved may be disabled, as by an accident, or as by breakdown or flat tire. Furthermore, the vehicle may be simply parked, or otherwise positioned in a tow-away, no parking zone. The dolly is brought up to such a vehicle, with the vehicle-supporting pads or vehicle-supporting means 46 and 48 in the lowered position, wherein they are close to the pavement. The dolly is slid laterally with respect to the wheel to be supported. Dolly wheels 26 and 28 are sufficiently small as to be able to fit under the vehicle to be supported, even though the tire on the vehicle may be flat to result in somewhat impaired clearance. The dolly 10 is illustrated as having four wheels of the same size, but in view of the difficulty of impaired clearance under the vehicle to be supported, the inboard wheels 26 and 28 may be of smaller diameter than the wheels 22 and 24, if desired. After the dolly 10 is slid into place with the main frame member substantially against the tire of the vehicle to be raised, a suitable lever or prybar is inserted above tube 38 and below crossbar 72. Successive operation of the prybar successively raises both vehicle support means 46 and 48. This causes latch pin 57 to be pushed back by means of latch plate 68 until the latch pin engages with respect to both vehicle support means. Now, the vehicle-supporting means is held in the raised position, so that that wheel of the vehicle is raised away from the pavement.

In most cases, this is repeated with another dolly on the opposite wheel of the vehicle to be supported, while a tow truck picks up the other end of the vehicle and tows it away. However, in the case of a flat tire, only the wheel having the flat tire need be raised. In such a case, the vehicle can drive away under its own power, at least a short distance, until the vehicle is in a safe place where the flat tire can be replaced or repaired. Lowering of the vehicle is accomplished in substantially reverse manner. A prybar is employed to raise the load off the pivot pin 56, whereupon the pivot pin can be thrust into the disengaged position.

This invention having been described in its preferred embodiment, it is clear that it is susceptible to numerous modifications and embodiments within the ability of those skilled in the art and without the exercise of the inventive faculty.

What we claim is:

1. A dolly, said dolly comprising:
   a frame, first and second axle shafts transversely secured to said frame adjacent the ends thereof, wheels mounted upon said shafts so that said wheels are rotatably mounted with respect to said frame so that said frame can be moved across a surface supported by said wheels;
   vehicle-supporting means comprising a pair of tire-engaging members, each pivotally mounted to one end thereof upon respective one of said shafts, said tire engaging members being movable from a lower, nonsupporting position to a raised, supporting position, said vehicle-supporting means being of such size as to be able to support a single vehicle tire;
   lock means interengaging between said vehicle-supporting means and said frame to maintain said vehicle-supporting means in the raised, vehicle-supporting position.

2. The dolly of claim 1 wherein said frame includes a main frame member and said shafts are secured to said main frame member, said shafts being secured to said main frame member in such a manner that said shafts extend a greater distance in one direction from said main frame member than in the other direction, said shaft extending a greater distance in the inboard direction than the outboard direction from said main frame member, so that the wheel mounted on said inboard end of said shaft is spaced farther from said main frame member than said wheel mounted on the outboard end of said shaft, said vehicle support means being movably mounted upon said frame inboard of said main frame member.

3. The dolly of claim 2 wherein said shafts are fixed with respect to said main frame member, and a tube is rotatably mounted upon each said shaft, a pair of arms secured to each said tube and a vehicle support pad pivotably mounted upon each said pair of arms so that said vehicle-supporting pad can be pivoted around said shaft.

4. The dolly of claim 3 wherein a latch is movably secured to said arms, said latch being engageable with said main frame member so that when said vehicle support pad is in a raised position, said latch engages with said main frame member to retain said vehicle support pad in its raised position.

5. The dolly of claim 4 wherein said pad is pivotably supported upon said arms by means of a tubular pivot shaft, a pivot pin movably mounted in said tubular pivot shaft, a latch plate on said main frame member, said pivot pin being movable into an opening in said latch plate so that the pivot pin acts as said latch holding said vehicle support pad with respect to said main frame member.

6. The dolly of claim 2 wherein said frame includes cross members secured to said main frame member, said cross members engaging said shafts away from said main frame member so as to strengthen said shafts with respect to said main frame member, and to form a U-shaped frame, said U-shaped frame having an opening on the inboard side thereof of such size as to permit the dolly to embrace a vehicle wheel.

7. The dolly of claim 6 wherein said wheels are mounted upon said shafts inboard of said crosspiece and outboard of said main frame member, said vehicle-supporting means being pivotably mounted upon said shafts so that the vehicle-supporting means are movable with respect to said frame.

8. The dolly of claim 7 wherein said tire-engaging member comprise a tube rotatably mounted upon each of said shafts, an arm secured to each said tube, and a vehicle support pad secured to each said arm so that said vehicle support pads can be rotated about said shafts.